Patented Dec. 9, 1941

2,265,799

UNITED STATES PATENT OFFICE 2,265,799

SOLUBLE OIL

Ejnar W. Carlson, Roselle Park, and Elmer B. Cyphers, Clark Township, Union County, N. J., assignors to Standard Oil Development Company, a corporation of Delaware No Drawing. Application March 16, 1940, Serial No. 324,356

9 Claims. (Cl. 252—49)

The present invention relates to improved lubricating and cooling compositions. The invention especially relates to non-foaming oil emulsions which are adapted for lubricating and cooling of various metallic surfaces under machining operations, particularly those operations conducted at relatively high speeds and pressures. The composition of the present invention comprises an emulsion and a foam suppressing agent selected from the class of salts which are characterized in that they may be produced from an amphoteric metallic oxide.

It is well known in the metal fabricating, cutting, and related arts to utilize various lubricating oil emulsions which serve to lubricate and cool the metal cutting tools employed in turning, drilling, grinding, and similar operations. These emulsions, in general, usually comprise a mineral oil, an emulsifying agent and water. For example, it is known to utilize as cutting fluids aqueous emulsions of mineral oils with sulfonate and naphthenate soaps derived from petroleum as emulsifiers, as well as aqueous emulsions of extreme pressure lubricants, or sulfur oils such as a sulfurized fatty oil. These emulsions, furthermore, may also contain relatively small amounts of various coupling agents and other dispersing agents, such as rosin soaps and alkalies which function to improve a particular characteristic of the composition. Although these emulsion compositions may be entirely satisfactory with respect to their lubricating and cooling characteristics, they are not entirely satisfactory due to the fact that in certain operations where copious fluid flow or spray are necessary, or where high speed operations are employed, excessive foaming occurs which hampers the efficiency of the particular operation and which also tends to cause overflow of the run-down tanks in which the emulsion is stored. In order to overcome this foaming difficulty, various suggestions have been practiced. For example, changes in the composition of satisfactory soluble oils have been made by the addition of aluminum soaps and certain waxes thereto in order to decrease the foaming tendencies of the emulsions. Although the foaming tendency may be reduced by these means this is not particularly desirable since, in general, changing the composition of otherwise satisfactory soluble oils may introduce undesirable properties such as gelation or separation of various constituents, or cause other changes which tend to decrease the lubricating and cooling efficiency of the soluble oil emulsion. Another means employed for preventing or retarding excessive foamation is to utilize a relatively unstable soluble oil whose emulsion will separate out free oil. The free oil which separates acts to some extent as a foam suppressor. This procedure likewise possesses a material disadvantage in that emulsions of this character tend to separate completely and fail under service conditions. We have now discovered a new class of substances which will result in the production of high quality soluble oils having improved lubricating and cooling properties and which will not extensively foam even under rather severe operating conditions.

The nature of our invention may be fully understood from the following description. We have found that improved soluble oil compositions may be formed by adding to its aqueous emulsions a foam suppressing agent selected from the class of substances which are characterized in that they may be produced from an amphoteric oxide. Substances of this character are, for example, the various plumbites, aluminates, and stannates. Our foam suppressing agent is selected from the class of salts which are characterized by containing in the anion a metal selected from the group consisting of lead, aluminum, zinc, and tin. Particularly desirable foam suppressing agents are selected from the class of salts which are characterized in that they may be produced from an amphoteric metal oxide and an alkali metal hydroxide. Substances of this character are, for example, sodium and potassium aluminates, sodium and potassium plumbites, sodium stannate, as well as the corresponding zinc salts. Particularly desirable foam suppressing agents are, for example, the alkali metal aluminates, as for example, sodium and potassium aluminates.

The amount of the foam suppressing agent used may vary widely, depending upon the particular soluble oil utilized, as well as upon the service conditions under which the resulting emulsion is employed. However, in general, it is preferred to use from about 0.01% to 2%, preferably from about 0.1% to 1%, of the foam suppressing agent based upon the volume of soluble oil in the emulsion. Our foam suppressing agents have been found to function exceptionally well as foam suppressing agents in soluble oils varying widely in character.

The base mineral oil of the soluble oil may vary considerably, such as an oil which boils in the lubricating oil boiling range, a spindle oil, a light oil, or a similar type of oil. Distillate oils derived from paraffinic or naphthenic crudes and having Saybolt viscosities at 210° F. between 60 seconds and 200 seconds are generally suitable. Usually the oils have viscosities below about 500 seconds at 100° F., although under certain conditions more viscous oils may be employed. In general, the amount of base mineral oil employed in the soluble oil varies in concentration from about 50% to about 90%.

Any suitable emulsifying agent may be employed to render the base oil readily miscible or emulsifiable with water. Suitable emulsifying agents are sodium, potassium or onium base naphthenates or sulfonates. Organic naphthenate soaps such as di- and tri-ethanol amine naphthenate may likewise be used. In general, it is preferred to employ a mixture of naphthenate and naphthenic sulfonates, as for example, one part naphthenate to four parts sulfonate. Usually from about 5% to 40% by weight of the emulsifying agent, based upon the volume of mineral oil, is employed.

Various dispersing agents adapted to disperse the respective phases in the form of a stable colloidal emulsions are also used. These agents are preferably soluble in water and are soluble at least to some extent from about 1% to 5% or more in mineral oils. Suitable dispersing agents of this character are, for example, polyhydric alcohols and polyhydric alcohol ethers, examples of which are glycol ethers such as di-ethylene glycol and tri-ethylene glycol. Usually the amount of dispersing agent utilized is from about 0.5% to 3%, based upon the volume of base oil.

The emulsifiable oils likewise may contain other substances such as rosin soaps and the like in the concentration of from 1% to 10%, as well as substances which render the composition slightly alkaline, such as strong alkalies of the character of sodium or potassium hydroxide, soda ash or carbonates. These latter materials are employed in the concentration of from 0.5% to 3%. The emulsifiable oil compositions may be mixed in any desirable concentration with water. In general, these oils are emulsified with from 25 volumes to 100 volumes of water per volume of oil.

In order to further illustrate the present invention, the following examples are given which should not be construed as limiting the same in any manner whatsoever:

*Example 1*

An emulsifiable soluble oil was produced by utilizing a petroleum base oil having the following inspection:

|   | Seconds |
|---|---|
| Saybolt viscosity Universal at 100° F | 100 |
| Gravity °A. P. I | 28 |
| Color—Robinson | 11 |
| Flash °F. Pensky Marten | 260 |

This base oil was blended to produce a soluble oil of the following composition:

|   | Per cent |
|---|---|
| Petroleum base oil | 85.10 |
| Purified petroleum sulfonate (mahogany sulfonate) | 9.50 |
| Naphthenic acids (recovered from petroleum heating oil) | 2.50 |
| Sodium hydroxide | 0.40 |
| Water | 1.60 |
| Isopropyl alcohol | 0.90 |
|   | 100.00 |

This soluble oil was emulsified with 40 parts by volume of water. The resulting emulsion was placed in a receptacle and the mass agitated by pumping and atomizing. The results of these operations were as follows:

| Concentration of anti-foaming agent added on basis of oil, per cent | Anti-foaming agent employed | Liquid level height units* |
|---|---|---|
| 0 |   | 10.0 |
| 0.2 | Sodium aluminate (Na$_2$AlO$_3$) | 4.0 |
| 0.6 | do | 4.0 |
| 1.0 | do | 3.0 |

*Known height before agitating mass 2.5 units.

From the above it is readily apparent that sodium aluminate is particularly effective in reducing the foaming tendencies of the oil. It is also apparent that the effective concentration on the basis of the oil of the sodium aluminate is in the range of about 0.1 to 0.4%.

*Example 2*

The emulsifiable oil of Example 1 was emulsified with 75 parts of water and the foaming tendencies measured. This was accomplished by pumping the emulsion through a series of pipes and finally allowing the emulsion to fall freely through a height of 12 feet into the storage tank held at room temperatures. The results of these operations were as follows:

| Concentration of anti-foaming agent added on basis of oil, per cent | Anti-foaming agent employed | Liquid level height units* |
|---|---|---|
| 0 |   | 19.0 |
| 0.2 | Sodium aluminate (NaAlO$_2$) | 7.0 |
| 0.6 | do | 4.0 |

*Known height before agitating mass 3.5 units.

From the above it is readily apparent that 0.2 to 0.6% of sodium aluminate is particularly effective in the reducing of the foaming tendencies of the emulsion.

*Example 3*

The corrosiveness of the soluble oil of Example 1 when emulsified with various quantities of water was determined with respect to various ferrous metals with and without the use of sodium aluminate. The tests were conducted by pouring 15 ccs. of emulsion at room temperature over about 2 ccs. of metal chips in Gooch crucible supported over glass vessels. The corrosion is evaluated visibly after the chips have remained 16 to 20 hours over the moist atmosphere prevailing above the glass vessels into which the emulsions had drained. The results of these tests were as follows:

|   | Cast iron, emulsions—water to oil | | | Malleable iron, emulsions—water to oil | | | Steel, emulsions—water to oil | | |
|---|---|---|---|---|---|---|---|---|---|
|   | 50/1 | 75/1 | 100/1 | 50/1 | 75/1 | 100/1 | 50/1 | 75/1 | 100/1 |
| Soluble oil | 3 | 3 | 2 | 3 | 3-4 |   | 0 | 0-1 | 1 |
| Soluble oil +0.2% sodium aluminate (based on oil) | 2 | 2 | 2 | 2-3 | 2-3 | 3 | 0 | 2 | 2 |

Legend: 0=bright.
4=very bad corrosion.

From the above it is apparent that in many instances the sodium aluminate did not increase and in many cases decreased the corrosiveness of the soluble oil.

The present invention is not to be limited by any theory as to mode of functioning or the like, but only in and by the following claims in which it is desired to claim all novelty in so far as the prior art permits.

We claim:

1. An oil emulsion comprising a mineral oil, water, an emulsifynig agent and a foam suppressing salt selected from the class of salts which are characterized in that they are produced by reacting an alkali metal hydroxide with an amphoteric oxide.

2. Process in accordance with claim 1 in which said salt is characterized in that it is produced by reacting an alkali metal hydroxide and an amphoteric oxide.

3. An oil emulsion comprising a mineral oil, water, an emulsifying agent, and an alkali metal aluminate.

4. An oil emulsion comprising a mineral oil, water, an emulsifying agent, and $Na_3AlO_3$.

5. An oil emulsion comprising a mineral oil, water, an emulsifying agent, and $NaAlO_2$.

6. An oil emulsion comprising a mineral oil, water, an emulsifying agent and a foam suppressing salt selected from the class of salts which are produced by reacting an alkali metal hydroxide with an oxide of a metal selected from the class consisting of lead, aluminum, zinc and tin.

7. An oil emulsion comprising water, from 50 to 90% of a petroleum oil, from 5 to 40% of an emulsifying agent, from ½ to 3% of a dispersing agent, from ½ to 3% of an alkali metal hydroxide and a foam suppressing salt selected from the class of salts which are characterized in that they are produced from an amphoteric oxide and an alkali metal hydroxide.

8. Process in accordance with claim 7 in which the anion of said salt contains aluminum and in which the cation is an alkali metal.

9. An oil emulsion comprising water, from 50% to 90% of a petroleum oil, from 5% to 40% of an emulsifying agent, from ½% to 3% of a dispersing agent, and from ½% to 3% of $NaAlO_2$.

EJNAR W. CARLSON.
ELMER B. CYPHERS.